(12) United States Patent
Hasegawa

(10) Patent No.: US 6,480,145 B2
(45) Date of Patent: Nov. 12, 2002

(54) GPS RECEIVER AND GPS POSITION MEASUREMENT METHOD

(75) Inventor: Koji Hasegawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/797,025

(22) Filed: Mar. 1, 2001

(65) Prior Publication Data

US 2001/0020913 A1 Sep. 13, 2001

(30) Foreign Application Priority Data

Mar. 2, 2000 (JP) ........................................ 2000-057814

(51) Int. Cl.[7] .............................. G01S 5/14; G06F 1/26
(52) U.S. Cl. .................................. 342/357.06; 713/322
(58) Field of Search ..................... 342/357.12, 357.15, 342/357.06, 385, 386; 713/324, 330, 322

(56) References Cited

U.S. PATENT DOCUMENTS

| | | | |
|---|---|---|---|
| 5,864,315 A | * 1/1999 | Welles, II et al. | ........... 342/357 |
| 5,893,044 A | * 4/1999 | King et al. | .................. 701/214 |
| 5,949,812 A | * 9/1999 | Turney et al. | ............... 375/200 |
| 6,327,473 B1 | * 12/2001 | Soliman et al. | ............. 455/456 |

* cited by examiner

*Primary Examiner*—Gregory C. Issing
(74) *Attorney, Agent, or Firm*—Frommer Lawrence & Haug LLP; William S. Frommer; Dennis M. Smid

(57) ABSTRACT

A GPS receiver is disclosed wherein GPS position measurement can be performed stably and rapidly without the necessity to wait for periodical time information from a GPS satellite and power consumption is minimized also with a minimized position measurement time through the selection of an optimum time interval between intermittent receptions of GPS signals. The GPS receiver includes a GPS block for performing position measurement based on a signal transmitted from a GPS satellite to update a navigation message and repeating standby and startup thereof, an external clock block for holding frequency information and time information of a high accuracy and outputting a start signal to the GPS block, which is in a standby state, based on the frequency information and the time information held therein, and a frequency measurement block for measuring a frequency offset which is a displacement of a frequency oscillator of the GPS block with reference to the frequency information held in the external clock block and outputting information of the measured frequency offset to the external clock block.

10 Claims, 9 Drawing Sheets

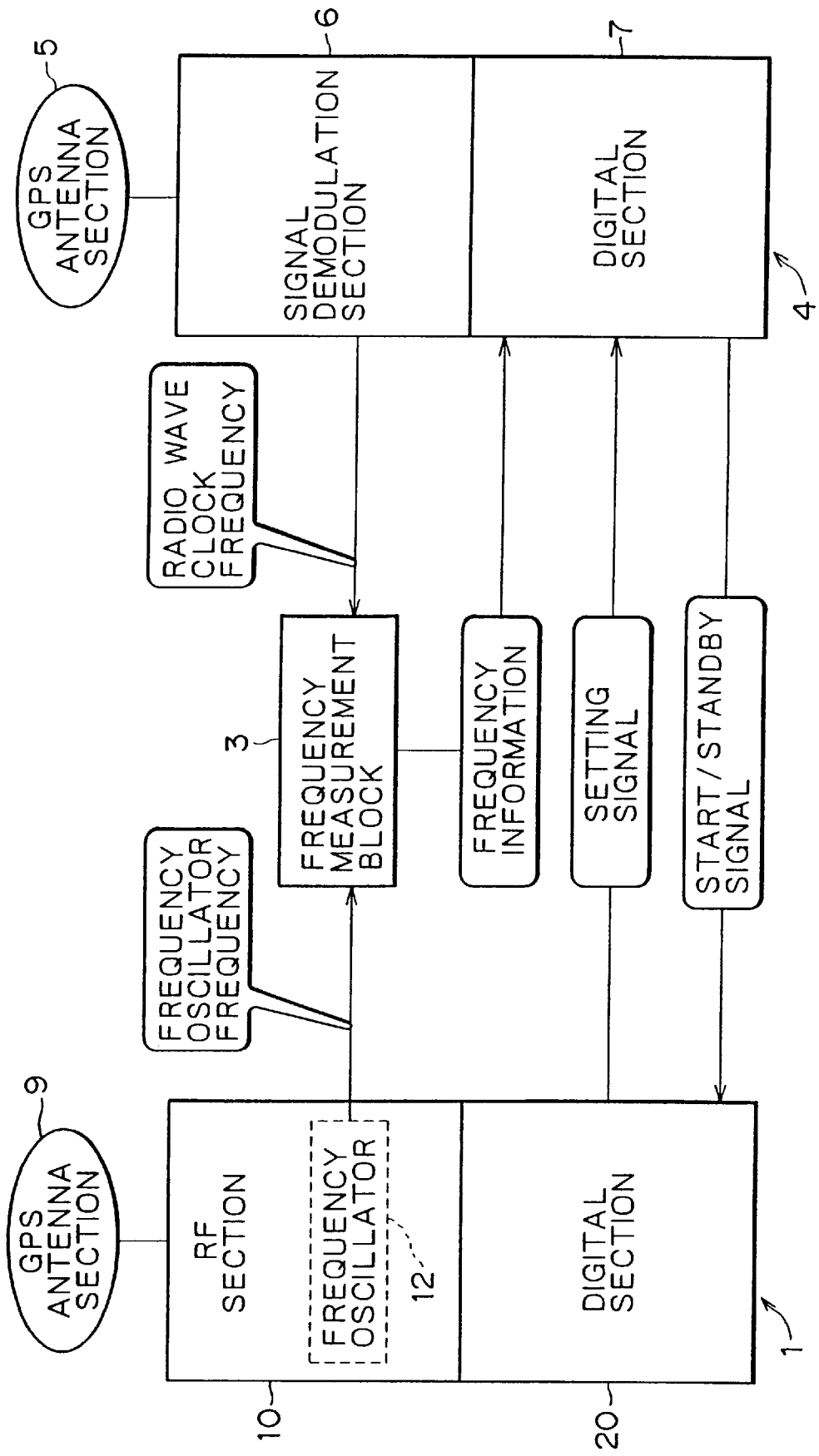

GPS RECEIVER AND GPS POSITION MEASUREMENT METHOD

BACKGROUND OF THE INVENTION

This invention relates to a navigation system for a mobile unit such as a car navigation system, and more particularly to a GPS receiver and a GPS position measurement method wherein GPS, (Global Positioning System) can be performed in a short time.

The GPS system is a position measurement system developed to allow a mobile unit such as an aircraft or a ship to determine the position on the earth or the velocity of the mobile unit on the real time basis utilizing GPS satellites which fly up in the sky. Recently, the GPS system is utilized widely in the field of the static survey for measuring the distance or the direction between different spots on the earth and the like fields in addition to the position measurement by a mobile unit. In order to utilize the GPS system, a GPS receiver for receiving radio waves radiated from GPS satellites is used.

FIG. 9A shows a general construction of a GPS system used popularly, and FIG. 9B illustrates a conventional GPS position measurement operation. Referring first to FIG. 9A, a spread spectrum signal of 1.57542 GHz is transmitted from a GPS satellite 200. An antenna section 211 of a GPS receiver 210 receives the transmitted signal after a propagation time which relies upon the distance between the GPS satellite 200 and the GPS receiver 210. The signal received by the antenna section 211 is down converted into a signal of a predetermined intermediate frequency by a radio frequency (RF) section 212 and then supplied to a signal synchronizing demodulation section 213. The intermediate frequency signal is despread into demodulated data by the signal synchronizing demodulation section 213. The demodulated data is used for position measurement calculation by a signal processing section 214. In this manner, the signal transmitted from the GPS satellite 200 is received and used for position measurement calculation by the GPS receiver 210.

FIG. 9B illustrates a conventional GPS position measurement operation performed by the GPS receiver 210. First, when power supply to the GPS receiver 210 is made available, a frequency search is performed. The frequency search is performed in order to synchronize a frequency of a low accuracy produced by a frequency oscillator 215 in the GPS receiver 210 and having an error with a signal frequency of a high accuracy transmitted from the GPS satellite 200. If some correlation between the frequencies is detected, then the GPS receiver 210 perform a PLL (Phase Locked Loop) operation for adjustment in phase to synchronize the internal frequency fully with that of the signal from the GPS satellite 200. Then, after an edge at a bit boundary is detected and therefore data can be fetched, time information is confirmed. In particular, the TOW (Time Of Week) placed in the second word of a subframe in a hierarchical navigation message and representative of a signal time within one week in the period of 6 seconds is fetched. After the TOW is fetched, position measurement calculation is started. After the position measurement calculation is completed, position measurement data is outputted, and the current position is calculated finally.

In this manner, the GPS position measurement method requires the frequency oscillator 215 for capturing a signal from the GPS satellite 200, and in order to establish synchronism with a signal frequency of a high accuracy transmitted from the GPS satellite 200, it is required that the frequency oscillator 215 is high in accuracy. However, the oscillation frequency of the frequency oscillator 215 is fluctuated generally by a temperature or a secular change of a quartz oscillator. This fluctuation prevents easy capture of the signal from the GPS satellite 200 through the use of the frequency oscillator 215, and therefore, a scheme of a frequency search must be provided separately. Since usually the frequency search requires much time, a considerably long time is required until the current position is calculated finally.

Further, in the conventional GPS position measurement method, the time required after the signal from the GPS satellite 200 is captured until all of absolute time information included in the signal is acquired is approximately 6 seconds even upon hot starting, with which the time is minimized, and in the best conditions, but usually, a time of tens and several seconds is required. Further, since position measurement calculation is performed using the acquired absolute time information, a considerably long time is required until the current position is calculated.

Furthermore, in the conventional GPS position measurement method, when position measurement is performed again after a time longer than a fixed interval of time elapses, time for fetching a navigation message newly is required. Therefore, a considerably long time is required until the current position is calculated.

Where much time is required for GPS position measurement from such reasons as described above, for example, in a car navigation system, the current position cannot be discriminated immediately after power supply is made available. This raises a problem that the route to a destination cannot be discriminated rapidly or the current position is unsettled due to an error of the self-contained navigation and this increases time until the correct position is discriminated. Further, in an apparatus of the type wherein a GPS receiver is built in or connected to a recent portable information terminal, if the apparatus is used principally during walking of the user, since the current position cannot be measured rapidly, the user must wait at a place with the apparatus held in hand until the position measurement is completed, which is very inconvenient.

On the other hand, it is also possible to perform position measurement with the power supply normally kept on. However, this causes the apparatus to consume very much power. Where the apparatus is particularly limited in power consumption like, for example, a car navigation system or a portable navigation system, it is not preferable to normally keep the power supply on.

Also where predetermined standby/startup of a GPS receiver is repeated to intermittently receive GPS signals, in order to maintain the accuracy in frequency and time, it is necessary to reduce the interval of intermittent receptions to perform position measurement frequently, resulting in increase of the power consumption.

SUMMARY OF THE INVENTION

It is an object of the present invention to provide a GPS receiver and a GPS position measurement method wherein GPS position measurement can be performed stably and rapidly without the necessity to wait for periodical time information from a GPS satellite. It is another object of the present invention to provide a GPS receiver and a GPS position measurement method wherein power consumption is minimized also with a minimized position measurement time through the selection of an optimum time interval between intermittent receptions of GPS signals.

In order to attain the objects described above, according to an aspect of the present invention, there is provided a GPS receiver, including a GPS block for receiving a signal transmitted from a GPS satellite and performing position measurement based on the received signal to update a navigation message and for repeating a standby state for reception and a startup state thereof, and an external clock block for storing frequency information and time information of a high accuracy, the external clock block outputting a standby signal and a start signal, which are to be transmitted to the GPS block, at predetermined time intervals based on a setting signal transmitted from the GPS block and the frequency information and the time information stored in the external clock block.

The GPS receiver may further include a frequency measurement block for measuring the difference of the frequency of a frequency oscillator of the GPS block from the frequency information held in the external clock block as a frequency offset, the frequency offset being outputted from the frequency measurement block to the external clock block. Further, the external clock block may output the standby signal and the start signal, which are to be transmitted to the GPS block, at predetermined time intervals based on the accuracy of the frequency information and the time information stored in the external clock block. With the GPS receiver, further reduction in power consumption can be anticipated.

The GPS receiver may further includes a frequency measurement block for measuring a frequency offset which is a displacement of a frequency oscillator of the GPS block with reference to the frequency information held in the external clock block and outputting the measured frequency offset to the external clock block. The external clock block may control standby and startup of the GPS block based on the frequency offset outputted from the frequency measurement block. With the GPS receiver, an optimum interval of intermittent GPS receptions can be obtained based on the frequency offset of the frequency oscillator, which allows augmentation in performance and further reduction in power consumption.

According to another aspect of the present invention, there is provided a GPS receiver, including a GPS block for receiving a signal transmitted from a GPS satellite and performing position measurement based on the received signal to update a navigation message and for repeating a standby state for reception and a startup state thereof, and a radio wave clock block for storing time information of a high frequency and frequency information of a high accuracy obtained through reception of a signal transmitted from a radio wave block broadcasting station, the radio wave clock block outputting a standby signal and a start signal, which are to be transmitted to the GPS block, at predetermined time intervals based on a setting signal transmitted from the GPS block and the time information and the frequency information stored in the radio wave clock block.

The radio wave clock block may output the standby signal and the start signal, which are to be transmitted to the GPS block, at predetermined time intervals based on the accuracy of the time information and the frequency information stored in the radio wave clock block. Where the radio wave clock block is used as the external clock block in this manner, the GPS receiver is advantageous in that, when the accuracy of the time information and the frequency information held in the radio wave clock block is high, the standby state of the GPS receiver can be extended in the maximum to a valid time of a navigation message and can be further extended to further reduce the power consumption.

According to a further aspect of the present invention, there is provided a GPS position measurement method for a GPS receiver, including the steps of receiving a hierarchical navigation message from each of a plurality of GPS satellites, storing the received navigation messages into a memory built in the GPS receiver, storing frequency information and time information of a high accuracy into an external clock which normally is in an operating state, and repeating a startup state and a standby state of the GPS receiver within a predetermined time in response to a standby signal and a startup signal outputted from the external clock based on the setting signal transmitted from the GPS receiver to the external clock and the frequency information and the time information stored in the external clock to perform position measurement of the GPS receiver from the GPS satellites to update the navigation messages stored in the memory.

Also with the GPS position measurement method for a GPS receiver, the GPS measurement time can be reduced significantly, and the necessity to wait for periodical time information from a GPS satellite is eliminated. Consequently, the time required before position measurement is stabilized and reduced. Further, since an optimum GPS reception interval can be selected in accordance with a situation of the external clock, reduction of power consumption can be anticipated.

Preferably, an interval of time between startup and standby of the GPS receiver is varied based on a degree of accuracy of the frequency information or the time information held by the external clock. With the GPS position measurement method, frequency information and time information of a high accuracy and a navigation message can be held with certainty without depending upon a situation of the external clock.

It is to be noted that, for example, if the external clock is constructed for reception of a carrier from a radio wave clock broadcasting station, the accuracy of the frequency information or the time information held by the external block allows elongation of the intermittent reception interval to the maximum even if the GPS receiver does not include a real time clock (RTC) of a high accuracy.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 8 is a diagrammatic view showing a general construction of another GPS receiver to which the present invention is applied.

DESCRIPTION OF THE PREFERRED EMBODIMENT

A. Embodiment 1

Figure 1:
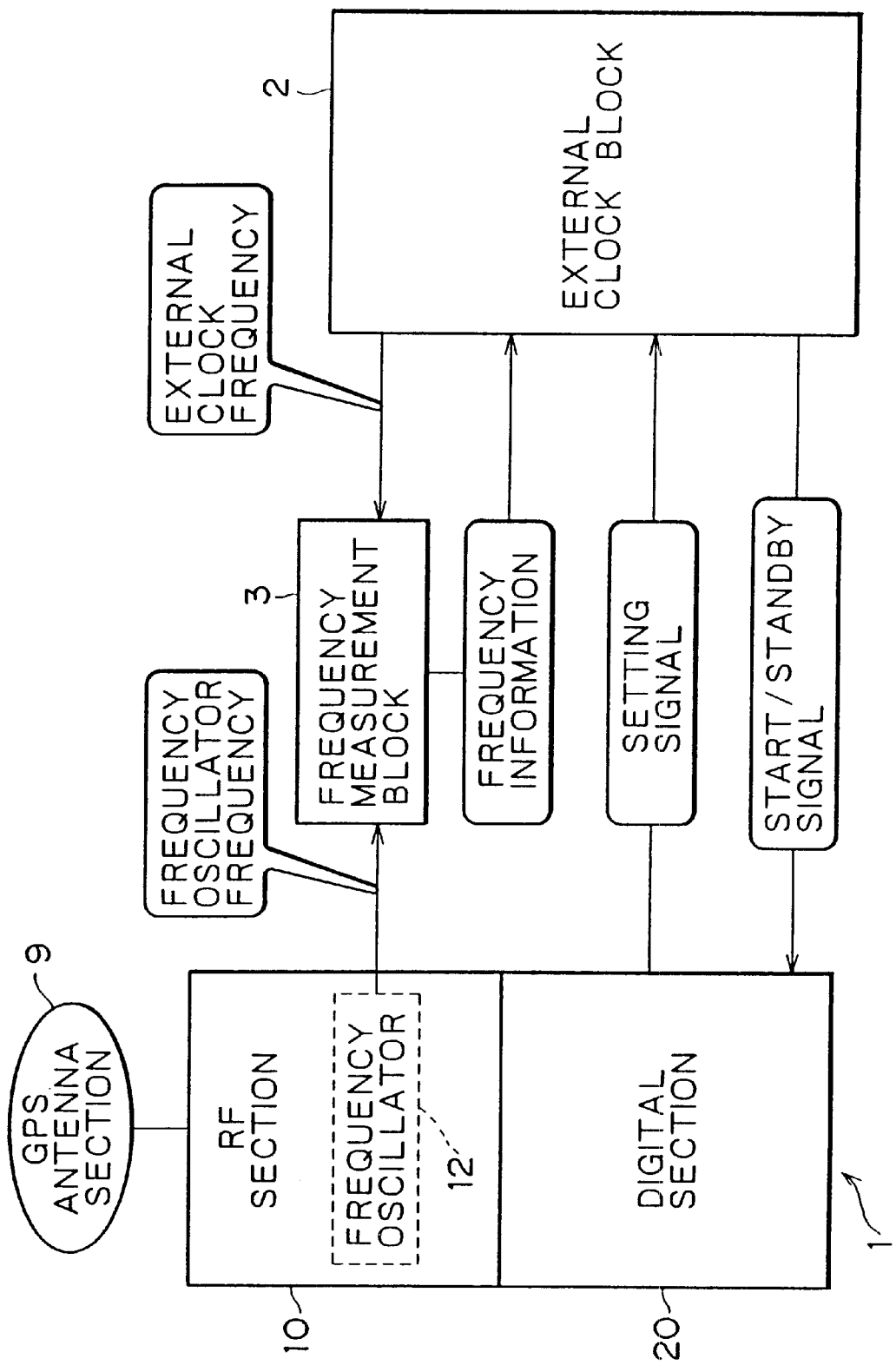
FIG. 1 is a diagrammatic view showing a general construction of a GPS receiver to which the present invention is applied.

Referring to FIG. 1, there is shown a general construction of a GPS receiver to which the present invention is applied. The GPS receiver shown includes a GPS block 1, an external clock block 2 and a frequency measurement block 3. The GPS block 1 includes a GPS antenna section 9 for receiving a radio wave of 1,575.42 MHz transmitted from a GPS satellite at the height of approximately 20,000 km, a radio frequency (RF) section 10 for converting the radio wave received by the GPS antenna section 9 into a signal of an intermediate frequency making use of a frequency of a frequency oscillator 12, and a digital section 20 for demodulating the radio wave signal of the intermediate frequency from the RF section 10, extracting necessary data from the radio wave signal of the intermediate frequency and calculating the current position of the GPS receiver based on the extracted data.

Meanwhile, the external clock block 2 is formed from a clock or a microcomputer having a built-in clock function which can transmit a predetermined signal in a predetermined period. The GPS block 1 sends to the external clock block 2 a setting signal indicative of a time interval after which the GPS block 1 should be started up. Upon reception of the setting signal, the external clock block 2 sets a time interval after which a start signal is to be sent to the GPS block 1. The external clock block 2 sends a start/standby signal to the GPS block 1. Upon reception of the start/standby signal, the GPS block 1 can start itself or stand by.

The frequency measurement block 3 measures a frequency offset which is an amount of displacement of the frequency of the frequency oscillator 12 of the GPS block 1 with reference to or from a frequency of a high accuracy held by the external clock block 2, and sends a value obtained by the measurement to the external clock block 2.

Figure 2:
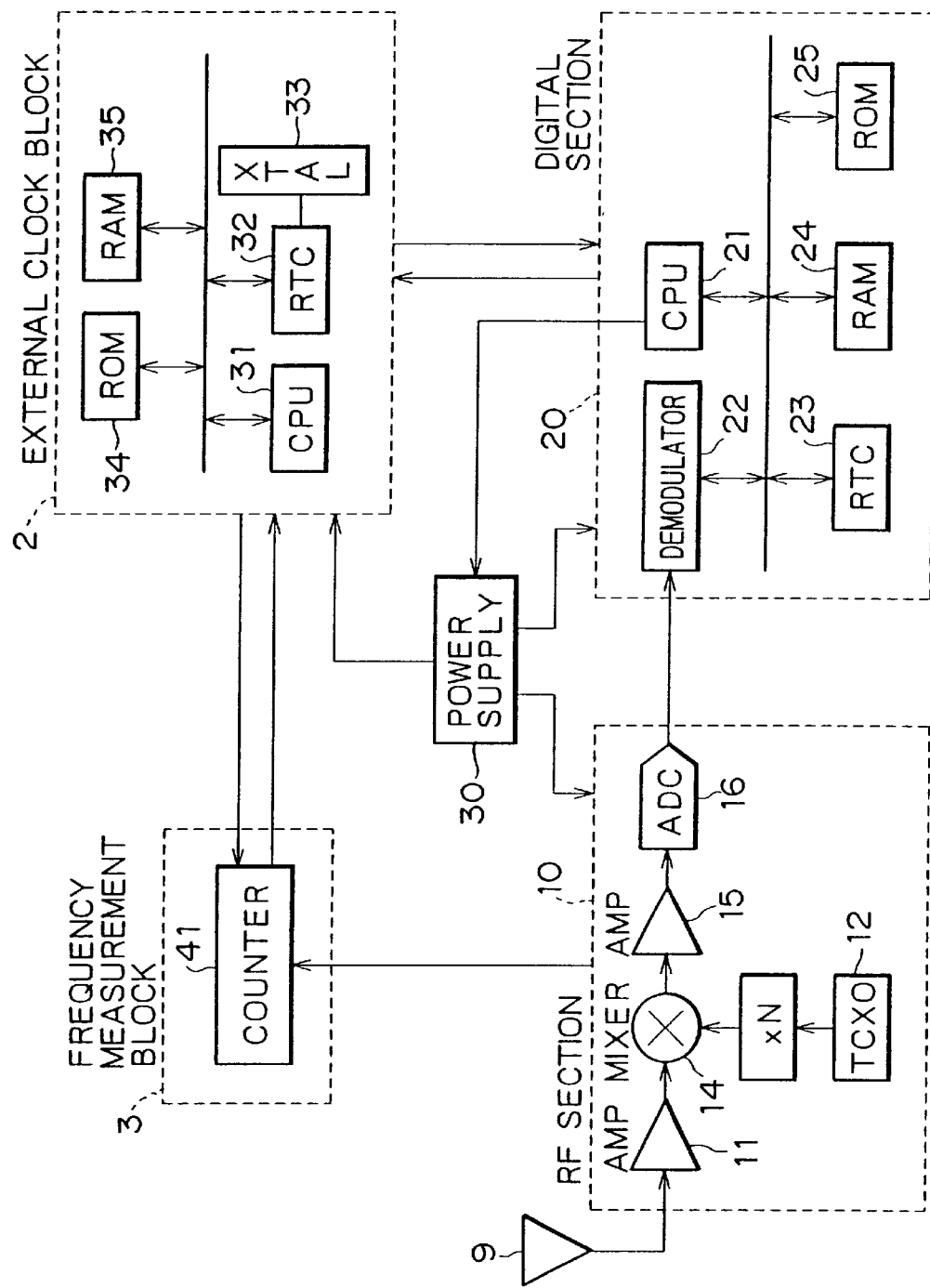
FIG. 2 is a block diagram showing a detailed construction of a GPS block, an external clock block and a frequency measurement block of the GPS receiver.

FIG. 2 shows a detailed construction of the GPS block 1, the external clock block 2 and the frequency measurement block 3. Referring to FIG. 2, a signal received by the GPS antenna section 9 is amplified by an amplifier (AMP) 11 of the RF section 10 of the GPS block 1. The RF section 10 has the frequency oscillator (TCXO) 12 provided therein. A frequency signal from the frequency oscillator 12 is multiplied to N times and then mixed with the signal amplified by the amplifier 11 by a mixer 14 so that the signal from the amplifier 11 is converted into an intermediate frequency signal. The intermediate frequency signal is amplified by an amplifier 15 and then converted into a digital signal by an AD converter (ADC) 16. The digital signal is inputted to the digital section 20.

The digital section 20 includes a CPU (Central Processing Unit) 21 for controlling the GPS block 1, a demodulator 22 for demodulating the intermediate frequency signal, and a real time clock (RTC) 23 for producing a clock. The digital section 20 further includes a RAM 24 so that a difference between the frequency of a high accuracy of a GPS satellite and the frequency of the built-in frequency oscillator may be stored as an offset or an acquired navigation message may be stored. The digital section 20 further includes a ROM 25 which has various kinds of control information and other necessary information stored therein.

The external clock block 2 includes a CPU 31 for controlling the external clock block 2, and a real time clock (RTC) 32 connected to a quartz oscillator (XTAL) 33 and having a clock function. The external clock block 2 further includes a ROM 34 in which control information is stored, and a RAM 35 for storing time information and so forth.

The GPS receiver further includes a power supply 30 for supplying power to the GPS block 1, the external clock block 2 and other components. The power supply 30 is controlled on/off by the CPU 21 so that it should or should not supply power to the GPS block 1 thereby to allow intermittent reception (sleep reception) wherein standby/startup of the GPS block are repeated.

Figure 3:
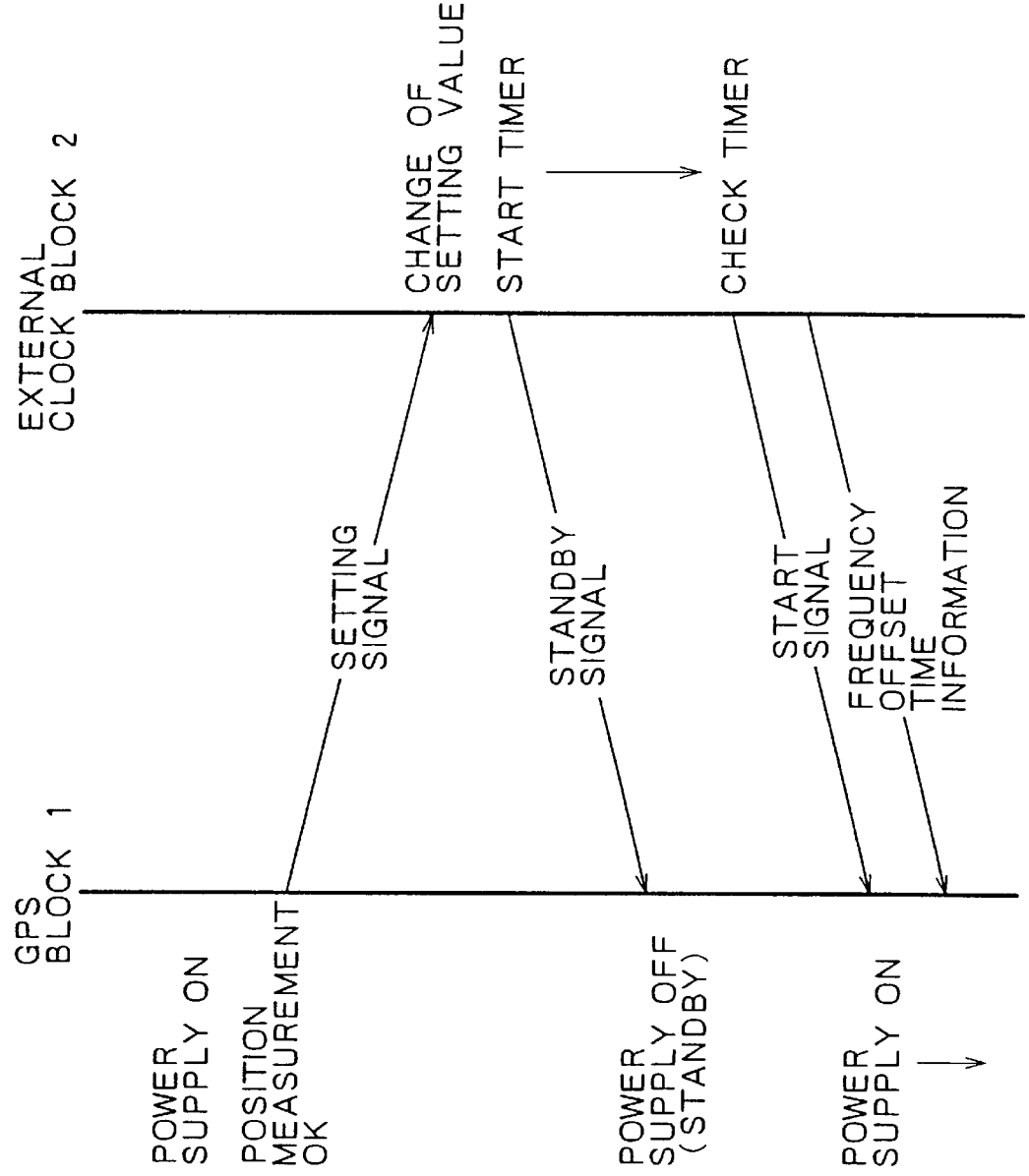
FIG. 3 is a diagrammatic view illustrating operation of and communication contents between the GPS block and the GPS control block.

The frequency measurement block 3 includes an internal counter 41. The counter 41 operates with an accurate clock obtained from a reference frequency signal from the external clock block 2 to count a measurement object frequency signal from the RF section 10 of the GPS block 1 within a predetermined time produced from the clock. The frequency measurement block 3 outputs the count value of the counter 41 as frequency measurement data (frequency information) to the external clock block FIG. 3 illustrates operation and contents of communication between the blocks 1 and 2. Referring to FIG. 3, a setting signal indicative of a time interval after which the GPS block 1 should be started up next is transmitted from the GPS block 1 to the external clock block 2. The external clock block 2 receives the setting signal transmitted thereto and signals a standby signal to the GPS block 1. Thereafter, the external clock block 2 starts up and checks the timer of the RTC 32. After the external clock block 2 discriminates elapse of a predetermined time based on the check, it transmits a start signal to the GPS block 1. At this time, where the external clock block 2 has frequency and time information of a high accuracy, also the frequency offset and time information is transmitted to the GPS block 1.

Figure 4:
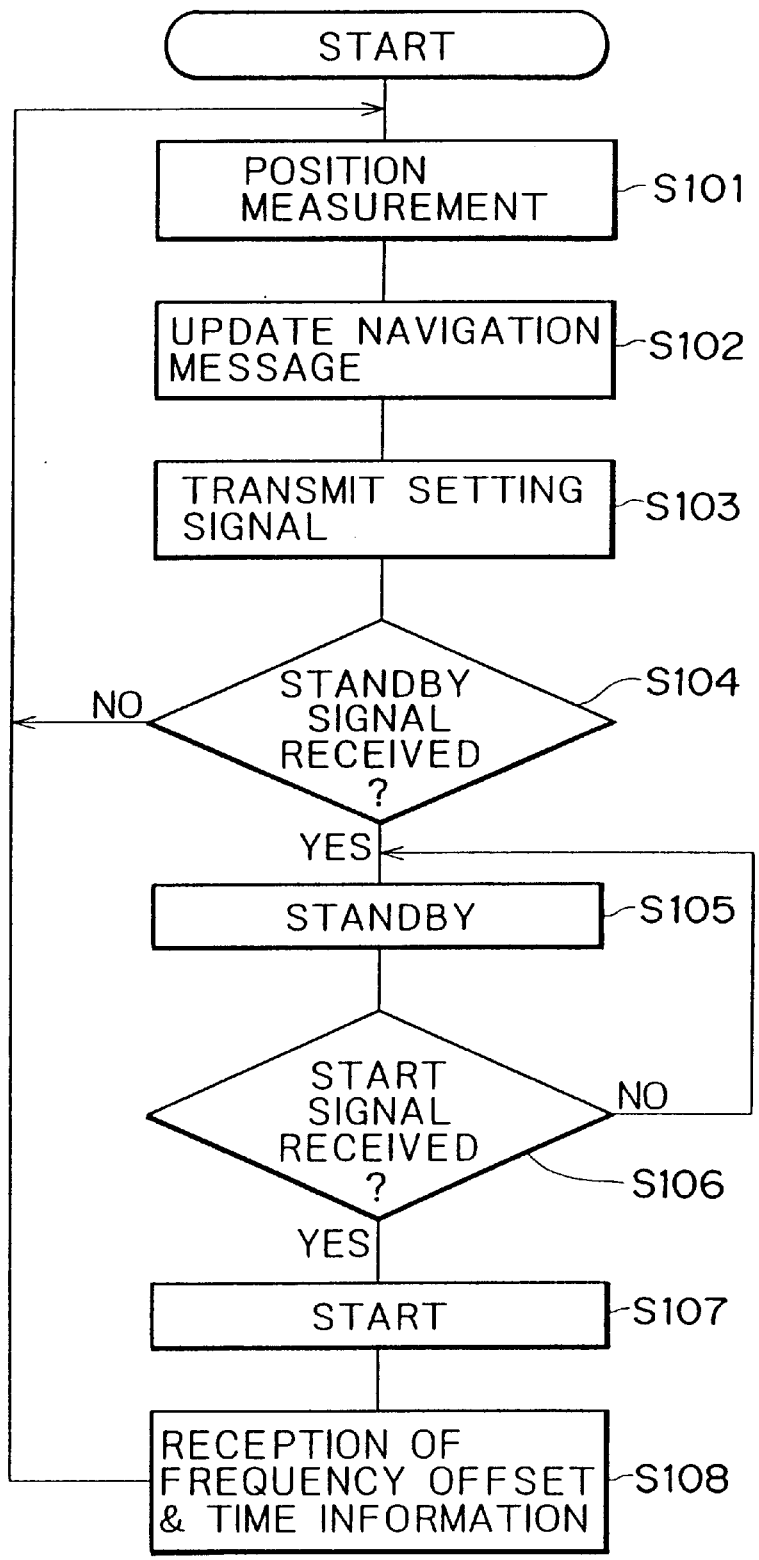
FIG. 4 is a flow chart illustrating a flow of processing in the GPS block.

FIG. 4 illustrates a flow of processing of the GPS block 1.

The GPS block 1 to which power is supplied first executes a first time position measurement (step S101). As a result of the position measurement, the navigation message stored in the RAM 24 is updated (step S102). Then, the GPS block 1 transmits a setting signal to the external clock block 2 (step S103). The setting signal includes a valid time (usually within approximately 2 hours) of a navigation message, and a time in which the error of the clock stored by the GPS receiver remains within a fixed value or a time in which the error of the frequency oscillator 12 stored by the GPS receiver remains within a fixed value. Thereafter, the GPS block 1 receives a standby signal from the external clock block 2 (step S104). Then, if a standby signal is not received, then the position measurement is repeated, that is, the GPS block 1 repeats the processing in steps 101 to 103. If a standby signal is received, then the GPS block 1 disconnects the power supply and enters a standby mode (step S105).

Then, when that one of the times set with the setting signal which has been selected in response to the state of the external clock block 2 elapses, the GPS block 1 receives a start signal from the external clock block 2 (step S106). Thus, the GPS block 1 starts up itself (step S107). However, before a start signal is received, the GPS block 1 keeps its standby mode. At this time, if the external clock block 2 holds frequency and time information of a high accuracy, the GPS block 1 receives the frequency offset and time information as well. Then, the GPS block 1 performs position measurement again (step S101) and updates the navigation message (step S102), and then enters a standby mode similarly (steps S103 to S105). If the external clock block 2 does not store frequency and time information of a high accuracy, such information is not transmitted to the GPS block 1, and consequently, the GPS 1 performs position measurement using frequency and time information stored therein. In this manner, the GPS block 1 of the GPS receiver of the present embodiment executes intermittent position measurement in two different ways in response to a situation of the external clock block 2, that is, either executes position measurement using frequency and time information from the external clock block 2 or executes position measurement using frequency and time information stored in the inside of the GPS block 1.

Figure 5:
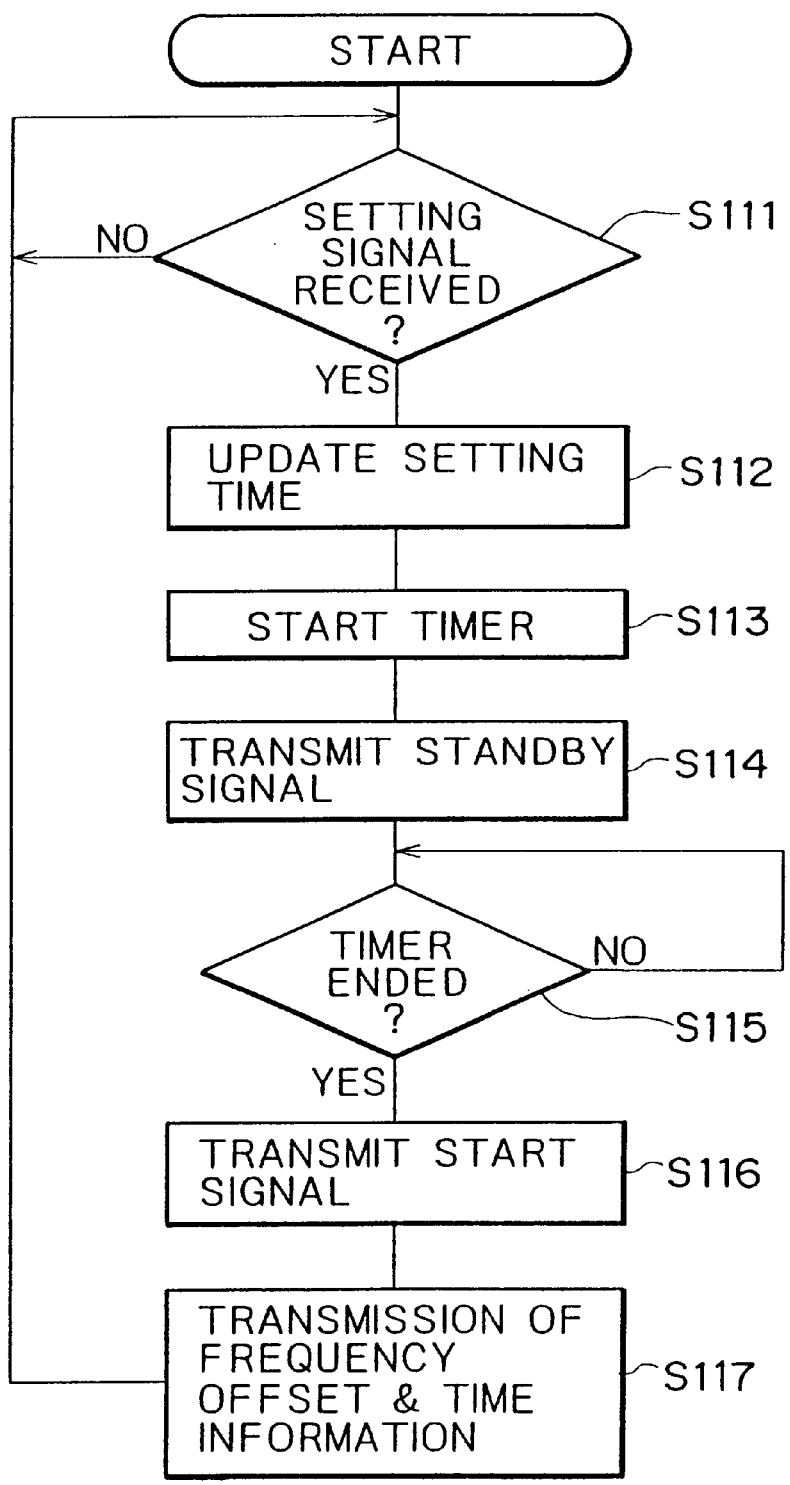
FIG. 5 is a flow chart illustrating a flow of a first process in the external clock block.

FIG. 5 illustrates a flow of a first process of the external clock block 2. The external clock block 2 of the GPS receiver of the present embodiment continues to normally operate and store frequency and time information of a high accuracy. The external clock block 2 first waits for a setting signal transmitted from the GPS block 1 (step S111). When a setting signal is received, the external clock block 2 updates the setting time of the RTC 32 based on accurate time sent thereto from the GPS block 1 (step S112) and starts up the timer (step S113). Then, the external clock block 2 transmits a standby signal to the GPS block 1 (step S114). Thereafter, the external clock block 2 continues to operate and discriminates whether or not counting of time of the timer comes to an end (step S115). The discrimination is repeated until counting of time of the timer comes to an end. After the counting of time of the timer comes to an end, that is, after the time interval set from the GPS block 1 elapses, the external clock block 2 transmits a start signal to the GPS block 1 (step S116). The GPS block 1 receives the start signal and cancels the standby mode described above to thus start up itself. At this time, the external clock block 2 transmits the frequency measured by the frequency measurement block 3 or the frequency offset and the time information stored therein as well to the GPS block 1 (step S117). Consequently, the GPS block 1 can repeat start/standby of itself after the predetermined time interval to repetitively update the frequency offset, the time and the navigation message and can thereby store a frequency reference and time information of a high accuracy and the latest navigation message.

Figure 6:
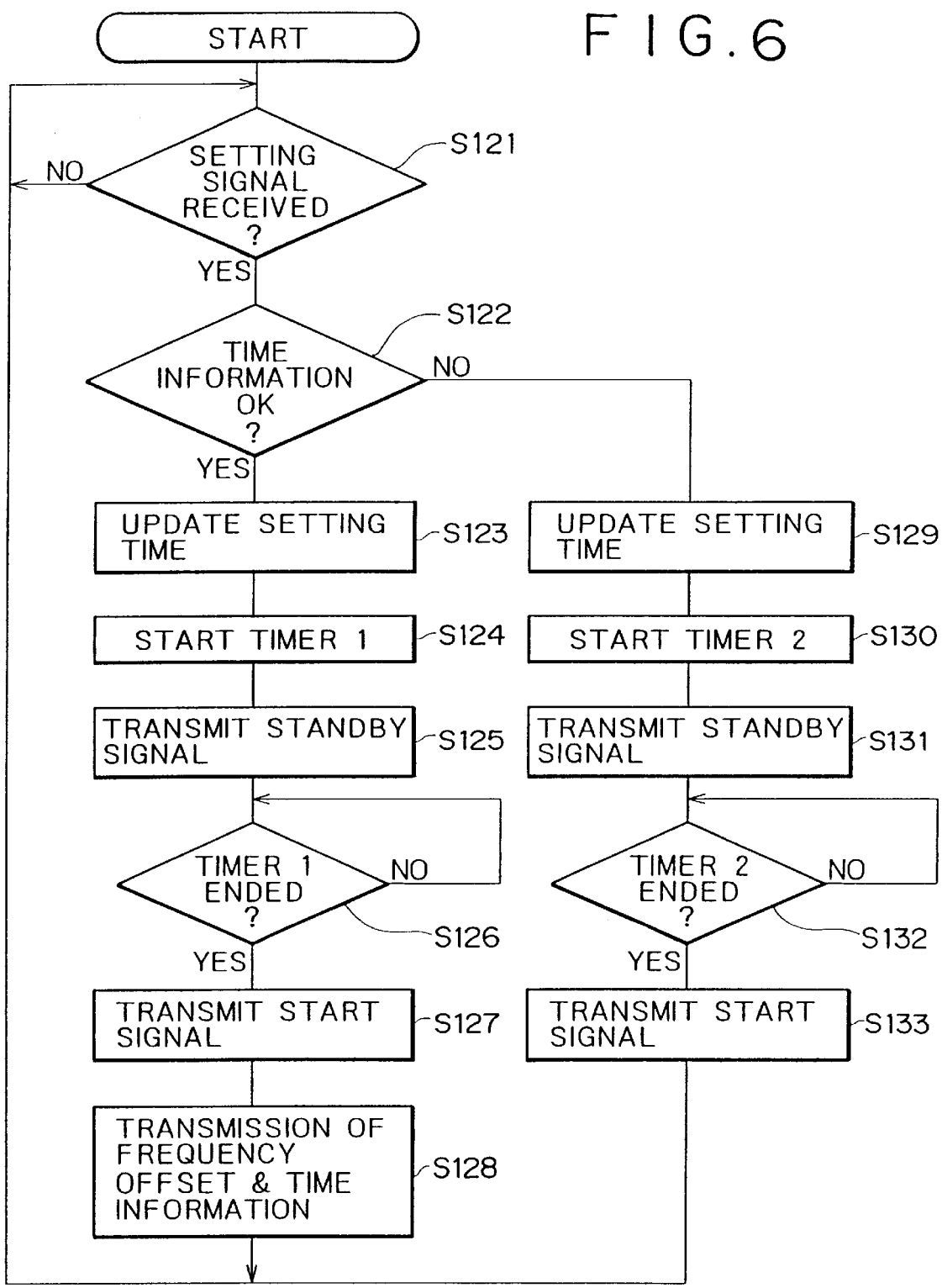
FIG. 6 is a flow chart illustrating a flow of a second process in the external clock block.

FIG. 6 illustrates a flow of a second process of the external clock block 2. Here, different processes are performed depending upon whether or not the frequency and time information is accurate to some degree. The external clock block 2 waits for a setting signal transmitted from the GPS block 1 (step S121). When a setting signal is received, the external clock block 2 checks the accuracy of the frequency and time information which is stored or can be acquired by the external clock block 2 (step S122). If the frequency and time information is accurate to some degree, then the external clock block 2 updates the setting time of the timer 1 (step S123). Then, the external clock block 2 starts up a timer 1 (step S124) and transmits a standby signal to the GPS block 1 (step S125). When the time of the timer 1 updated with the setting signal elapses after the standby signal is transmitted (step S126), the external clock block 2 transmits a start signal to the GPS block 1 (step S127). Further, the external clock block 2 transmits the frequency offset and time information stored therein as well to the GPS block 1 (step S128).

On the other hand, if it is discriminated in step S122 that the frequency and time information which is held or can be acquired by the external clock block 2 is inaccurate, then the external clock block 2 updates the setting time of a timer 2 (step S129). Then, the external clock block 2 starts up the timer 2 (step S130) and transmits a standby signal to the GPS block 1 (step S131). When the time of the timer 2 updated with the setting signal elapses after the standby signal is transmitted (step S132), the external clock block 2 transmits a start signal to the GPS block 1 (step S133). In this manner, the interval of time between a standby signal and a start signal to be transmitted to the GPS block 1 is varied depending upon the accuracy of the frequency and time information which is stored or can be acquired by the external clock block 2, and also contents to be transmitted to the GPS block 1 upon transmission of a start signal can be varied.

It is to be noted that the frequency measurement block 3 uses the frequency of a high accuracy stored by the external clock block 2 as a reference to measure the frequency of the frequency oscillator 12 of the GPS block 1 or the frequency offset which is a displacement of the frequency of the frequency oscillator 12 from the frequency of the external clock block 2 and sends the measured value to the external clock block 2.

As described above, in the GPS receiver of the present embodiment, the external clock block 2 always operates, and the GPS block 1 can always store frequency and time information of a high accuracy and navigation message. Where the GPS information store such information, the time required for GPS position measurement can be reduced significantly.

Further, where the external clock block 2 always operates and the interval of time of intermittent receptions of the GPS block 1 is varied based on the accuracy of the frequency and time information which is stored or can be acquired by the external clock block 2, frequency and time information of a high accuracy and a navigation message can be stored with certainty without depending upon the situation of the external clock block 2. Further, where the external clock block 2 can store or acquire frequency and time information of a high accuracy, the valid time of the navigation message can be elongated. Therefore, the interval of time of intermittent receptions of the GPS block 1 can be increased, and consequently, reduction of the power consumption can be achieved.

Figure 7:
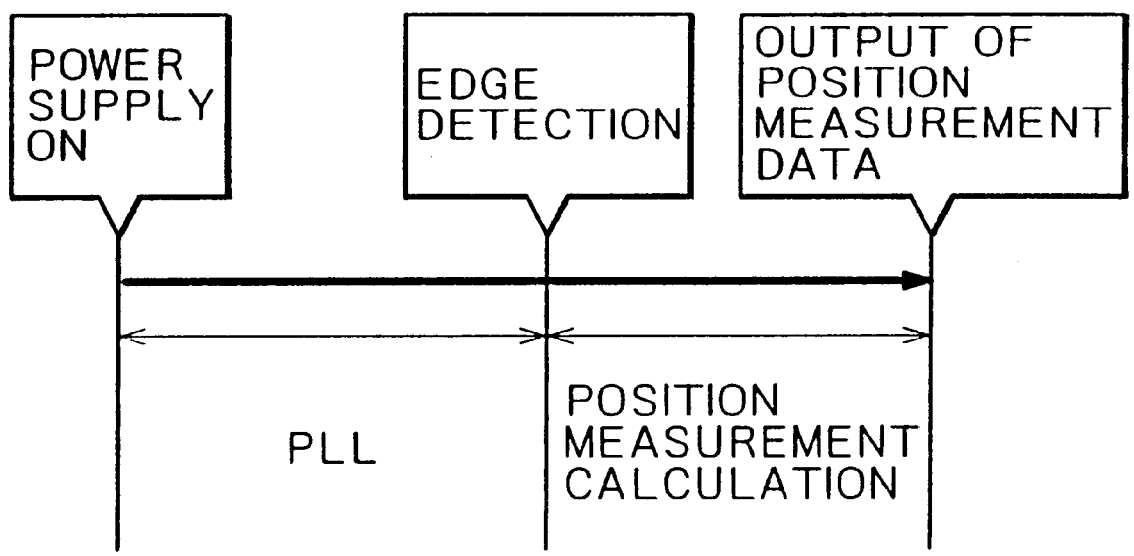
FIG. 7 is a diagrammatic view illustrating position measurement operation in the GPS receiver.
Figure 9A:
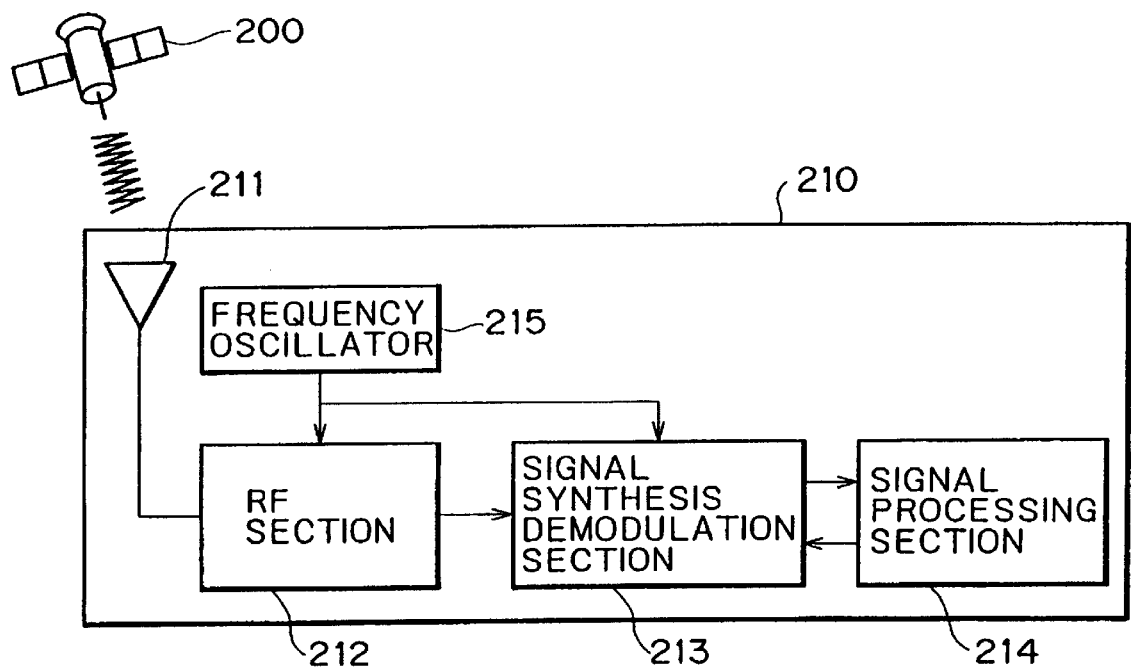
FIGS. 9A and 9B are diagrammatic views showing a general construction of a conventional GPS system and illustrating conventional GPS position measurement operation, respectively.
Figure 9B:
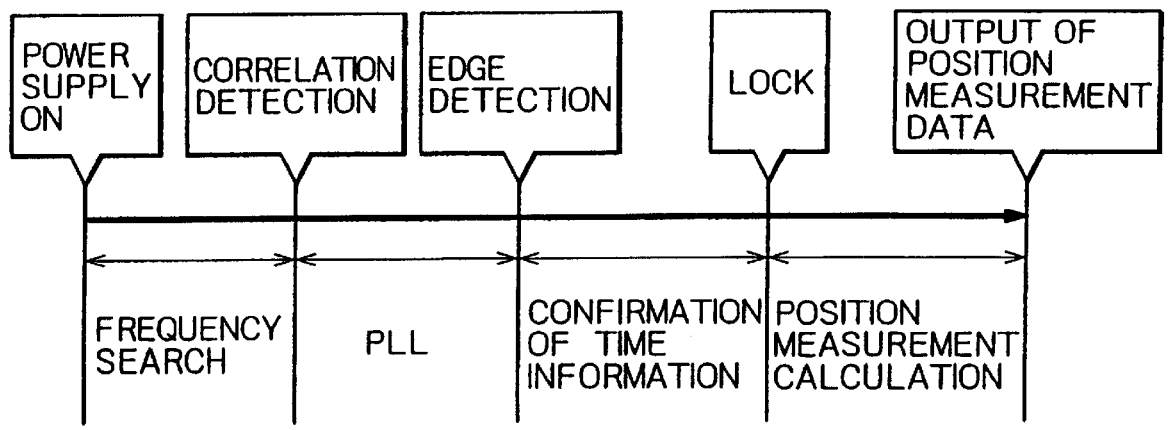

FIG. 7 illustrates a position measurement operation of the GPS receiver of the present embodiment. An ordinary GPS receiver first performs a frequency search after power supply is made available as seen in FIG. 9B. The frequency search is to establish synchronism in frequency with a signal from the GPS satellite 200 using a frequency oscillated by the frequency oscillator 215 in the GPS receiver 210 as described above. Usually, the accuracy of the frequency oscillator 215 in the GPS receiver 210 is deteriorated by the temperature or the secular change of the quartz oscillator, and this sometimes fluctuates the frequency thereof from its accuracy frequency. In such an instance, synchronism with the signal from the GPS satellite 200 cannot be established. Therefore, the frequency of the frequency oscillator 215 in the GPS receiver 210 is successively displaced stepwise until synchronism with the accurate signal from the GPS satellite 200 is established. Then, at a point of time when a correlation of a certain level is detected by the frequency search, phase adjustment is performed using the PLL. Then, after the phase adjustment is completed, range data which represents a distance from each GPS 200 is acquired, which enables demodulation of data. While the state in which demodulation data can be acquired continues, it is waited that time information in data is acquired. Then, when data is acquired, position measurement calculation is performed, and resulting position data is outputted. Accordingly, if a frequency of a high accuracy which is free from frequency fluctuation by the temperature or a secular change of the quartz oscillator can be obtained as the frequency of the frequency oscillator 215 in the GPS receiver 210, then such a frequency search as described above with reference to FIG. 6 need not be performed. Further, if time information of a high accuracy can be obtained simultaneously, then the necessity to perform confirmation of time information is eliminated.

In particular, as seen from FIG. 7, with the GPS receiver of the present embodiment, part of operation necessary for the GPS position measurement is not required any more, and phase adjustment in which a PLL is used can be started immediately and then a position measurement operation can be started immediately. As a result, the time which has been required for the operation is not required any more, and the position measurement time can be reduced significantly.

On the other hand, when no navigation message is held at a point of time when position measurement is started or when lapse of time invalidates a navigation message, further time for acquiring a navigation message is required in a GPS position measurement operation. In the GPS receiver of the present embodiment, however, since the navigation message is always updated to the latest one, acquisition of a navigation message can be omitted from position measurement. Consequently, the position measurement time can be reduced significantly.

B. Embodiment 2

The GPS receiver of the Embodiment 1 described above includes the frequency measurement block 3 so that the interval of time between intermittent receptions of GPS signals is varied in accordance with the accuracy of frequency and time information which is stored in or can be acquired by the external clock block 2. The GPS receiver of the present Embodiment 2 is a modification to but is different from the GPS receiver of the Embodiment 1 in that it uses a radio wave clock block, which makes use of a radio wave clock as an external clock, in place of the external clock block 2 to vary the interval of time of intermittent receptions of GPS signals. Thus, overlapping description of the other common components is omitted here to avoid redundancy.

Referring to FIG. 8, there is shown a general construction of the GPS receiver of the Embodiment 2. The GPS receiver of the Embodiment 2 includes a radio wave clock block 4 in addition to the GPS block 1 and the frequency measurement block 3 described hereinabove with reference to FIG. 1. The radio wave clock block 4 includes a GPS antenna section 5 for receiving a carrier of 40 KHz which is a standard radio wave controlled by the Communications Research Laboratory of the Ministry of Post and Telecommunications of Japan, a signal demodulation section 6 for amplifying and detecting the carrier received by the GPS antenna section 5, and a digital section 7 for reading time information from the waveform detected by the signal demodulation section 6.

In the GPS receiver of the present embodiment, power is normally supplied to the radio wave clock block 4 so that the radio wave clock block 4 receives a signal from a radio wave clock broadcasting station to normally store time information of a high accuracy and a frequency reference of a high accuracy. The radio wave clock block 4 outputs a frequency of the carrier of 40 KHz amplified but before detected by the signal demodulation section 6 to the frequency measurement block 3. The frequency measurement block 3 thus uses the counter 41 described hereinabove to detect an error of the frequency oscillator 12 of the GPS block 1. The radio wave clock block 4 receives the error of the frequency oscillator 12 as frequency information and suitably sets a standby time based on the frequency information. Then, the radio wave clock block 4 controls standby/startup of the GPS block 1 based on the standby time so as to perform intermittent reception. The GPS block 1 starts up itself periodically under the control of the radio wave clock block 4 and updates ephemeris data necessary for position measurement calculation which are position information of GPS satellites. When the acquisition of ephemeris data is completed, the GPS block 1 enters a sleep (standby) mode. Repetitions of such startup/standby allow the GPS block 1 to normally store the latest ephemeris data.

In order to perform position measurement, the GPS block 1 receives time information and frequency information (errors) from the radio wave clock block 4 at a moment when power supply to the GPS block 1 is made available. The GPS receiver can use the information to perform such high speed position measurement as described hereinabove with reference to FIG. 7.

An interval of time between sleep receptions (intermittent reception) and average power consumption necessary to normally realize high speed position measurement where the GPS receiver of the present embodiment is used are examined here.

Where the power consumption of the GPS block 1 is represented by Wgps, the standby time by TK, and the startup time by Ton, the average power consumption Wavg can be calculated in accordance with $$Wavg=(Wgps \times Ton)/Tk$$

In the GPS receiver of the present embodiment, the sleep reception is used only for acquisition of ephemeris data, and therefore, it can be considered that the period necessary for updating the ephemeris data is equal to the interval of time between sleep receptions. Usually, it is regarded that the life of ephemeris data is approximately 2 hours. Therefore, also the updating time is considered to be 2 hours (7,200 seconds) at the maximum. Further, if it is assumed that the startup time (time for acquisition of ephemeris data) Ton is 60 seconds and the power consumption Wgps of the GPS block 1 is 580 mW, then $$Wavg=(580 \text{ mW} \times 60 \text{ s})/7{,}200 \text{ s}=4.8 \text{ (mW)}$$

Thus, if it is assumed that the power consumption of the radio wave clock block 4 is 15 mW, then the total power consumption is 4.8+15=19.8 (mW). Consequently, the power consumption can be reduced significantly.

Further, with the GPS receiver of the present embodiment, even if it does not include a real time clock (RTC) of a high accuracy inside thereof, the sleep reception interval of the GPS receiver can be increased to the maximum. Also from this, the average power consumption can be suppressed low. Furthermore, since a frequency reference of a high accuracy from the radio wave clock block 4 can be utilized, even if the frequency oscillator in the GPS receiver has a great error, reliable high speed position measurement can be achieved.

While preferred embodiments of the present invention have been described using specific terms, such description is for illustrative purposes only, and it is to be understood that changes and variations may be made without departing from the spirit or scope of the claims that follow.

What is claimed is:

1. A GPS receiver, comprising:

a GPS block for performing position measurement based on a signal transmitted from a GPS satellite to update a navigation message;

an external clock block for holding frequency information and time information of a high accuracy and outputting a start signal to said GPS block, which is in a standby state, based on the frequency information and the time information held therein; and a frequency measurement block for measuring a frequency offset which is a displacement of a frequency oscillator of said GPS block with reference to the frequency information held in said external clock block and outputting the measured frequency offset to said external clock block, wherein said external clock block controls standby and startup of said GPS block based on the frequency offset outputted from said frequency measurement block.

2. A GPS receiver, comprising:

position measurement execution means including a frequency oscillator for performing position measurement based on a signal transmitted from a GPS satellite;

radio wave clock reception means for receiving a carrier from a radio wave clock broadcasting station; and frequency measurement means for measuring an error of said frequency oscillator of said position measurement execution means based on a frequency of the carrier received by said radio wave clock reception means, wherein said frequency measurement means outputs the measured error of said frequency oscillator to said radio wave clock reception means, and said radio wave clock reception means controls startup/standby of said position measurement execution means based on the error of said frequency oscillator outputted from said frequency measurement means.

3. A GPS position measurement method for a GPS receiver, comprising the step of:

receiving a hierarchical navigation message from each of a plurality of GPS satellites;

storing the received navigation messages into a memory;

storing frequency information and time information of a high accuracy into an external clock which normally is in an operating state; and repeating startup and standby of said GPS receiver within a predetermined time determined using the frequency information and the time information held in said external clock to perform position measurement of said GPS receiver from said GPS satellites to update the navigation messages stored in said memory, wherein an interval of time between startup and standby of said GPS receiver is varied based on a degree of accuracy of the frequency information or the time information held by said external clock.

4. A GPS receiver, comprising:

a GPS block for receiving a signal transmitted from a GPS satellite and performing position measurement based on the received signal to update a navigation message and for repeating a standby state for reception and a startup state thereof; and an external clock block for storing frequency information and time information of a high accuracy;

said external clock block outputting a standby signal and a start signal, which are to be transmitted to said GPS block, at predetermined time intervals based on a setting signal transmitted from said GPS block and the frequency of information and the time information stored in said external clock block.

5. A GPS receiver according to claim 4, further comprising a frequency measurement block for measuring the difference of the frequency of a frequency oscillator of said GPS block from the frequency information stored in said external clock block as a frequency offset, the frequency offset being outputted from said frequency measurement block to said external clock block.

6. A GPS receiver according to claim 4, wherein said external clock block outputs the standby signal and the start signal, which are to be transmitted to said GPS block, at predetermined time intervals based on the accuracy of the frequency information and the time information stored in said external clock block.

7. A GPS receiver, comprising:

a GPS block for receiving a signal transmitted from a GPS satellite and performing position measurement based on the received signal to update a navigation message and for repeating a standby state for reception and a startup state thereof; and a radio wave clock block for holding time information of a high frequency and frequency information of a high accuracy obtained through reception of a signal transmitted from a radio wave clock broadcasting station;

said radio wave clock block outputting a standby signal and a start signal, which are to be transmitted to said GPS block, at predetermined time intervals based on a setting signal transmitted from said GPS block and the time information and the frequency information stored in said radio wave clock block.

8. A GPS receiver according to claim 7, wherein said radio wave clock block outputs the standby signal and the start signal, which are to be transmitted to said GPS block, at predetermined time intervals based on the accuracy of the time information and the frequency information stored in the said radio wave clock block.

9. A GPS position measurement method for a GPS receiver, comprising the steps of:

receiving a hierarchical navigation message from each of a plurality,of GPS satellites;

storing the received navigation messages into a memory built in said GPS receiver;

storing frequency information and time information of a high accuracy into an external clock which normally is in an operating state; and repeating a startup state and a standby state of said GPS receiver within a predetermined time in response to a standby signal and a startup signal outputted from said external clock based on a setting signal transmitted from said GPS receiver to said external clock and the frequency information and the time information stored in said external clock to perform position measurement of said GPS receiver from said GPS satellites to update the navigation messages stored in said memory.

10. A GPS position measurement method according to claim 9, wherein an interval of time between startup and standby of said GPS receiver is varied based on a degree of accuracy of the frequency information or the time information stored by said external clock.

* * * * *